C. O. RIPLEY.
Machines for Making Telegraph-Pins.

No. 147,793. Patented Feb. 24, 1874.

Witnesses.
Harry King.
Wm. R. Stansbury.

Inventor,
Charles O. Ripley
by Stansbury & Munn
his attys.

AM. PHOTO-LITHOGRAPHIC CO. N.Y. (OSBORNE'S PROCESS.)

UNITED STATES PATENT OFFICE.

CHARLES O. RIPLEY, OF NEWARK, NEW JERSEY.

IMPROVEMENT IN MACHINES FOR MAKING TELEGRAPH-PINS.

Specification forming part of Letters Patent No. 147,793, dated February 24, 1874; application filed February 3, 1874.

*To all whom it may concern:*

Be it known that I, CHARLES O. RIPLEY, of the city of Newark, county of Essex and State of New Jersey, have invented a Machine for Making Telegraph-Pins; and I do hereby declare the following to be a full and correct description of the same, reference being had to the accompanying drawings, in which—

Figure 1:
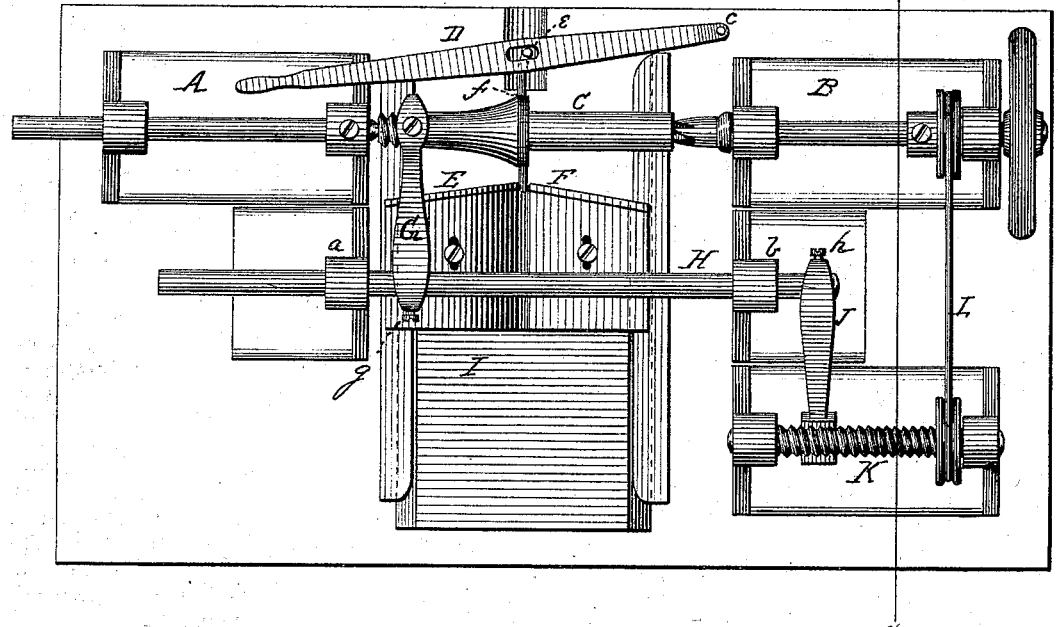
Figure 2:
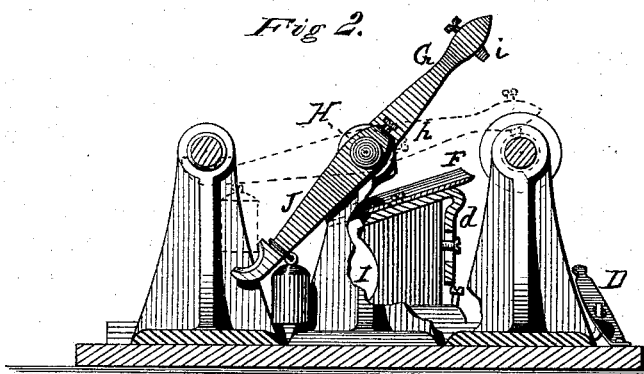

Figure 1 is a top-plan view, and Fig. 2 a vertical cross-section on the line $x$ $x$ of Fig. 1.

The object of my invention is to provide a machine for rapidly cutting telegraph-pins, with both ends tapering, and with the upper end provided with a screw-thread for receiving the glass insulators; and consists in combining, with an ordinary lathe, two adjustable knives, a screw-cutter, and screw feed-guide, constructed and arranged for operation as hereinafter described.

In the drawings, A and B represent the opposite heads of an ordinary lathe, and I a carriage arranged to slide under and between them by means of a lever, D, pivoted at $c$, and loosely connected to it at $e$ by a rod, $f$, as shown in Fig. 1. To the upper side of the carriage I, and at a suitable height, are attached supports $d$, as shown in Fig. 2, and to these supports two adjustable knives, E and F, as shown in Fig. 1. In the rear of the lathe-heads A and B a shaft, H, is mounted loosely in bearings $a$ and $b$, and to it are attached a screw-cutter, G, and a screw feed-guide, J, as shown in the same figure. The knife of the screw-cutter is fastened to the free end of the same, and so as to come on a direct line between the heads of the lathe. The screw feed-guide has its free end provided with screw-threads, and is so arranged that it may be thrown in gear with a screw-feed, K, mounted loosely in bearings, and operated by a belt, L, from the lathe, as shown in Fig. 1. It is also weighted, so that it will drop out of gear when the free end of the screw-cutter is raised, as shown in Fig. 2.

Having properly set the knives E F, the screw-cutter G, and feed-guide J, the block C, from which the pin is to be formed, is inserted between the heads of the lathe in the usual manner, and revolved rapidly. The carriage I is then drawn quickly forward by the lever D, when the knives E F cut the pin in the desired form. This done, the screw-cutter G is pressed down upon the upper end of the pin, which causes the guide J to engage at the same time with the feed-screw K, and move the shaft H longitudinally, and thus cause the cutter to form the screw on the pin, as shown. As soon as this is done, the cutter is released, and the feed-guide at the same time.

As will be seen, by means of this machine, telegraph-pins of the same size and form, and provided with a screw-thread, are cheaply and rapidly made.

Having thus described my invention, what I claim is—

A telegraph-pin-cutting machine, consisting of an ordinary lathe, in combination with the cutting-knives E F, screw-cutter G, feed-guide J, and feed-screw K, constructed and arranged to operate substantially as described.

The above specification of said invention signed and witnessed at Washington, D. C., this 28th day of January, A. D. 1874.

CHARLES O. RIPLEY.

Witnesses:
 H. B. MUNN,
 W. P. BELL.